Patented Feb. 19, 1924.

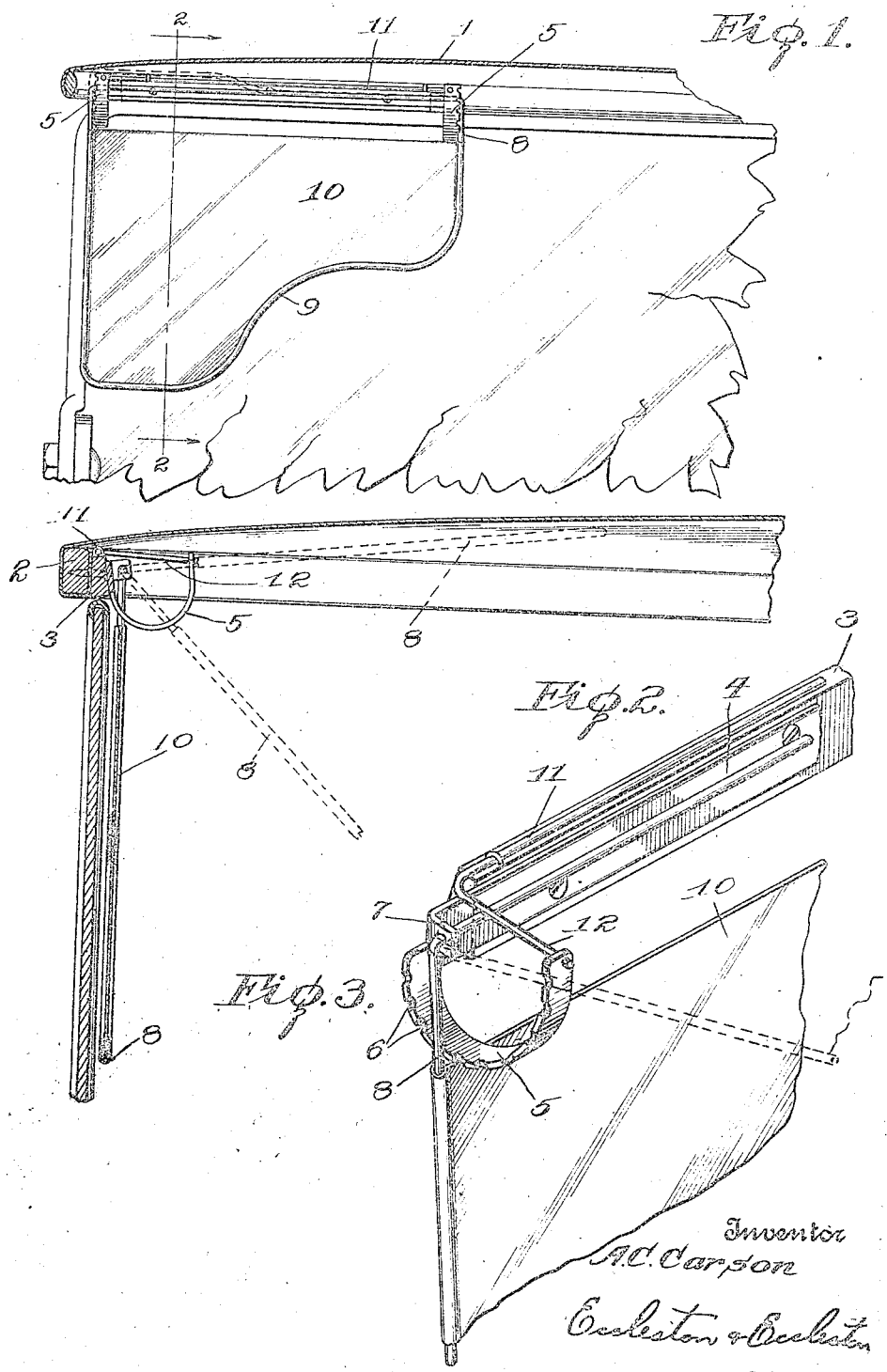

1,484,551

UNITED STATES PATENT OFFICE.

ASHMEAD C. CARSON, OF COLUMBIA, SOUTH CAROLINA.

GLARE SHIELD FOR AUTOMOBILES.

Application filed August 14, 1922. Serial No. 581,802.

*To all whom it may concern:*

Be it known that I, ASHMEAD C. CARSON, a citizen of the United States, residing at Columbia, in the county of Richland and State of South Carolina, have invented certain new and useful Improvements in Glare Shields for Automobiles, of which the following is a full, clear, and exact description.

My invention relates to glare shields, and more especially to a shield adapted to be associated with the windshield of an automobile for the purpose of protecting the eyes of the driver from the glare of the road and also from the glare of the headlights of approaching automobiles.

An object of the invention is to provide a simple and inexpensive shield having the foregoing characteristics and which can be folded into an unobtrusive position when not in use.

Another object of the invention is to so curve the lower edge of the shield that it will follow the position of the approaching light.

Other objects and advantages of the invention will be apparent from the following description when taken in connection the accompanying drawings, in which:

Figure 1 is a fragmentary view of the forward portion of an automobile, showing the shield in position; the view being from the interior of the automobile.

Figure 2 is a section taken on line 2—2 of Figure 1; various positions of the shield being indicated by dotted lines; and Figure 3 is a perspective view of the shield and related parts ready for mounting on an automobile top.

Referring to the drawing more in detail, the numeral 1 designates the usual automobile top provided with the forward brace member 2 on which my improved shield is pivotally mounted.

Secured to the forward brace member 2 of the top 1 is a base member 3 which is beveled on one side to give the proper pitch to the attachment. This member 3 may be formed of wood or metal, as desired. Attached to the rear face of the base member 3 is a metallic strip 4 which terminates in a pair of arc-shaped resilient arms 5, each of which is provided with a series of notches or serrations 6 on its outer edge. Each end of the strip 4 is further provided with a rearwardly bent lug 7 which forms a bearing for the shield frame 8.

The shield frame 8 is formed of a piece of wire bent to form a closed figure, the top of which extends through apertures in the lugs 7 whereby the shield frame is mounted to swing in a vertical plane. The lower edge of the frame is curved, as indicated at 9, and the frame is covered by a sheet of translucent or opaque material 10.

In the construction as described the side arms of the frame 8 engage the serrated resilient arms 5. To insure at all times a proper frictional contact between the frame 8 and the arms 5 it is found desirable to supplement the resiliency of the arms 5 by means of a spring 11 which is secured to the upper face of the base member 3 and has its ends 12 extending at right angles and engaged in the free ends of the arms 5.

In operation it is only necessary for the driver to grasp the frame 8 and swing the same to any position desired between the full line position and the upper dotted line position. When adjusted to the proper position the objectionable rays will be received on the translucent or opaque sheet 10 and thus shield the eyes of the driver.

By having the lower edge of the shield curved as indicated at 9 it is possible to obstruct the rays of an approaching car to a maximum degree, while obstructing the driver's vision to a minimum extent. This is due to the fact that the approaching light gradually moves to the left and downwardly and the lower portion of the shield is shaped to meet this movement. It will be understood, of course, that the invention is not limited to the specific shape of the shield shown herein, and I may employ a shield of any shape desired.

It will be apparent from the foregoing description that I have invented a glare shield which is highly efficient in operation, most simple in construction, inexpensive in manufacture, and one which is adapted to use in connection with all types of tops for either open or closed cars.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. A glare shield, including a base, a frame hinged thereto, a resiliently mounted arm frictionally engaged by said frame, and resilient means for increasing the pressure of said arm against the frame.

2. A glare shield, including a base, a frame hinged thereto, a pair of resiliently mounted integrally connected arms extending between the sides of said frame and secured to said base, said arms provided with serrations adapted to be engaged by said frame.

3. A glare shield, including a base, a frame hinged thereto, resiliently mounted arms secured to said base and frictionally engaged by said frame, and expansible means engaging said arms and tending to force them against the frame.

4. A glare shield, including a base, a frame hinged thereto, resiliently mounted arms secured to said base and frictionally engaged by said frame, and a U-shaped member formed of resilient material and having its legs connected to the resiliently mounted arms.

5. A glare shield, including a base, a metallic strip attached to said base, a portion of both ends of the strip being bent to form curved arms, another portion of both ends of the strip being formed into bearings, a shield frame pivotally mounted in said bearings and frictionally engaging said curved arms.

ASHMEAD C. CARSON.